July 15, 1958

C. H. LEWIS, JR 2,843,683

TELEVISION TUNER INPUT CIRCUIT

Filed Oct. 26, 1956

Inventor
CHALMER H. LEWIS Jr.
by
Mason, Kolehmainen, Rathburn and Wyss.
Attorneys United States Patent Office 2,843,683

Patented July 15, 1958

2,843,683

TELEVISION TUNER INPUT CIRCUIT

Chalmer H. Lewis, Jr., Bloomington, Ind., assignor to Sarkes Tarzian, Inc., Bloomington, Ind., a corporation of Indiana Application October 26, 1956, Serial No. 618,560

8 Claims. (Cl. 179—171)

Figures 1, 2:
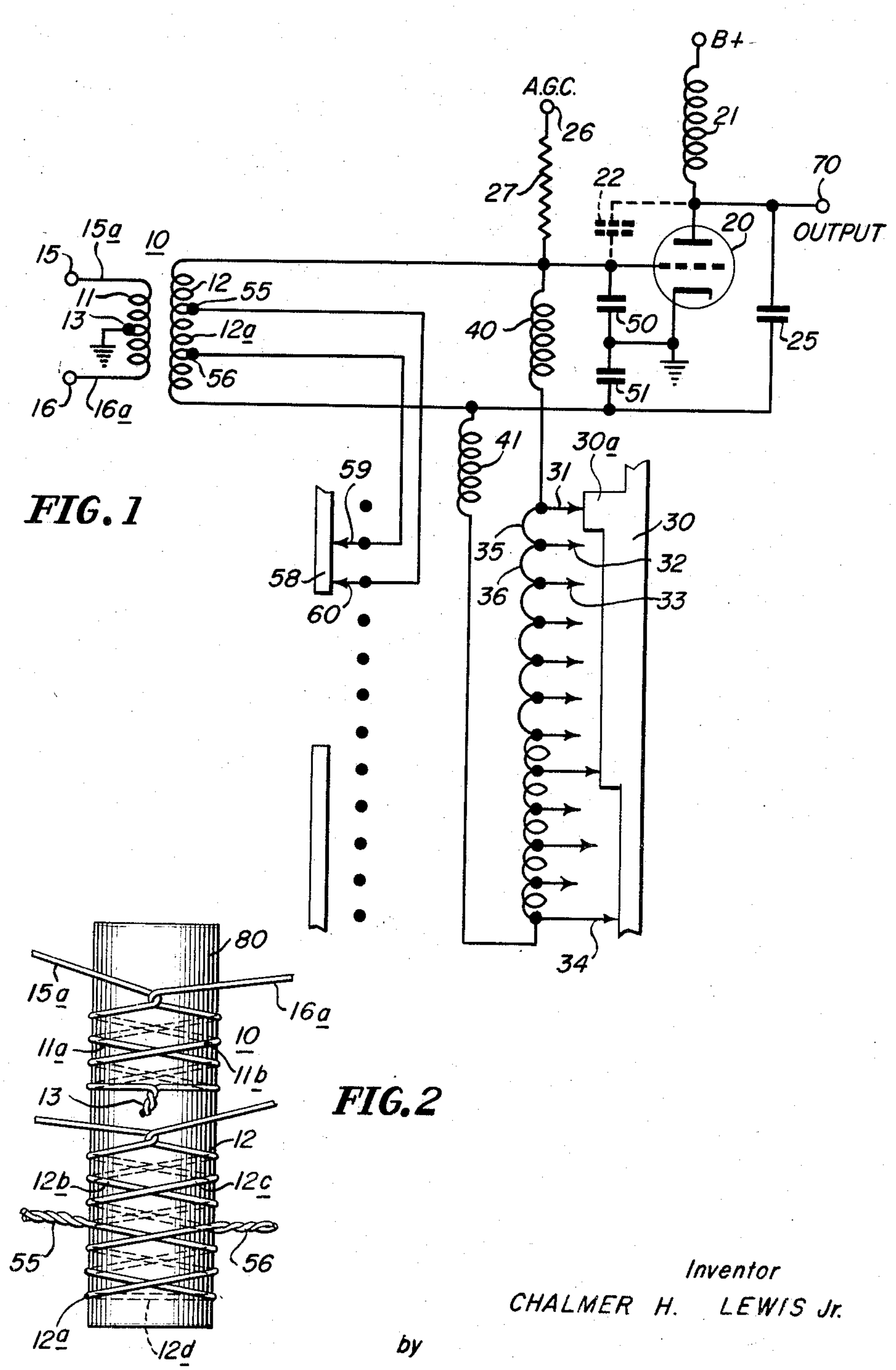

The present invention relates to television tuners, and, more particularly, to the antenna input circuit portion of a television tuner wherein signals may be received from any one of a number of television stations and selectively amplified therein.

According to present day television standards to V. H. F. or very high frequency television band is divided into a low frequency V. H. F. band comprising channels 2 to 6, inclusive, and a high frequency V. H. F. band comprising channels 7 to 13, inclusive. However, in V. H. F. tuners adapted to receive television stations in both the low and high frequency V. H. F. bands, the problem arises of matching the antenna input circuit to the input impedance of the first amplifier tube over both these frequency bands. The input impedance of the amplifier tube varies considerably from the low band to the high band, but the antenna input impedance, which is conventionally a 300 ohm transmission line, remains the same for both bands. Accordingly, it is necessary to change the impedance of the amplifier input circuit when receiving signals in either the high band or the low band. While certain arrangements heretofore proposed have employed a switching arrangement for changing the impedance of the antenna input circuit for low band or high band reception, these arrangements have not been altogether satisfactory in that a certain amount of unbalance was produced by the switching arrangement. This unbalance is particularly undesirable if the first amplifier stage is neutralized, as is necessary with the commonly used cascode input stage wherein a first triode is employed as a neutralized first amplifier stage and a second triode is operated as a grounded grid amplifier. Furthermore, unbalance due to impedance changing switching permitted the oscillator signal developed in the tuner to feed back through the input transformer to the antenna circuit itself and, hence, caused undesirable radiation of the local oscillator signal which would adversely affect other television receivers in their vicinity.

It is, therefore, an object of the present invention to provide a new and improved antenna input circuit for a television tuner which is adapted to receive signals in both the low frequency and high frequency V. H. F. television bands.

It is another object of the present invention to provide a new and improved antenna circuit for a television tuner wherein the input circuit impedance is changed for low band and high band reception while maintaining a capacity balance with respect to ground.

It is a further object of the present invention to provide a new and improved antenna input circuit for a television tuner wherein the impedance of the input circuit is substantially decreased for high band reception while providing facilities for preventing local oscillator signal radiation through the antenna input circuit.

A further object of the present invention resides in the provision of a new and improved antenna input circuit for a television tuner wherein a neutralized input amplifier stage may be employed and the impedance of the input circuit changed while maintaining a balanced condition with respect to ground.

The invention, both as to its organization and method of operation, together with further objects and advantages thereof, will best be understood by reference to the following specification taken in connection with the accompanying drawings, in which:

Fig. 1 is a schematic diagram of the antenna input circuit portion of a television tuner embodying the principles of the present invention; and Fig. 2 is a side elevational view, somewhat diagrammatic, of the input transformer employed in the circuit of Fig. 1.

Referring now to the drawings, the antenna input circuit of the present invention is therein illustrated as comprising an antenna input transformer, indicated generally at 10, which is provided with a balanced primary winding 11 and a secondary winding 12, the center tap 13 of the primary winding 11 being connected to ground and the outer ends of this primary winding being connected to the antenna input terminals 15 and 16, it being understood that a suitable antenna circuit such as a conventional antenna system and 300 ohm transmission line is connected to the input terminals 15 and 16.

The upper end of the secondary winding 12 is connected to the control grid of a first amplifier stage 20 the cathode of the tube 20 being connected to ground and the anode of the tube 20 being illustrated as connected to a source of B+ through the anode load inductance 21. The tube 20, which may be of the commercial type 6BN4, is illustrated as a triode tube, and will have a certain amount of capacity between the control grid and anode thereof as indicated by the dotted line condenser 22. Due to feedback through the condenser 22 it is necessary to neutralize the input amplifier stage 20, particularly for the high band frequencies. Such neutralization is accomplished by means of a neutralizing condenser 25 which is connected from the anode of the tube 20 to the bottom end of the secondary winding 12. A suitable automatic gain control voltage, which is conventionally derived from the second detector of the associated television receiver, may be impressed upon the terminal 26 and coupled through the resistor 27 to the control grid of the tube 20 so as to provide the customary AGC action, as will be readily understood by those skilled in the art.

In order to tune the secondary winding 12 to any one of the high band and low band V. H. F. television stations, there is provided station selector switch means which includes a rotor 30 and a plurality of stator contacts 31, 32, etc., the rotor 30 having a station selecting position for each of the twelve V. H. F. channels. In Fig. 1 the rotor 30 is shown in the channel 13 position and the station selector switch is illustrated in developed form to simplify the illustrations of the circuit connections thereto. However, it will be understood that the rotor 30 actually comprises an annular rotor plate which is arranged to make contact with the angularly spaced stator switch contacts 31, 32, etc., in different station selecting positions of the rotor.

In order to provide incremental inductive tuning of the secondary winding 12 for different television stations there is provided a plurality of incremental inductances connected between individual ones of the stator contacts. Thus, a first inductive increment 35 is connected between the stator contacts 31 and 32, a second inductive increment 36 is connected between the stator contacts 32 and 33, etc. In the channel 13 position, the rotor 30 shorts out all of the incremental inductances and is directly connected across the secondary winding through the substantially identical inductances 40 and 41 and the stator contacts 31 and 34. Accordingly, the inductance of the coils 40 and 41 together with the inductance of the rotor 30 and the associated leads is so chosen that the input circuit of the tube 20 will be tuned to the highest frequency station in the high frequency V. H. F. band. In the channel 12 position the blade portion 30*a* of the rotor 30 makes contact with the stator contacts 32 so that the inductive increment 35 is unshorted and is connected in series with the coils 40 and 41 across the secondary winding 12 so as to tune the input circuit of the tube 20 to the channel 12 band. In a similar manner successive additional inductive increments are inserted in series with the coils 40 and 41 for successively lower frequency stations.

In order to balance the secondary winding 12 with respect to ground there is provided a first balancing condenser 50 which is connected between the control grid of the tube 20 and ground and a condenser 51 which is connected from the bottom end of the transformer winding 12 to ground, the condensers 50 and 51 being so chosen that the capacity to ground from both ends of the secondary winding 12 is substantially equalized.

In order to change the impedance of the secondary winding 12 during high band reception while maintaining the above described capacity balance for the input circuit of the tube 12, there is provided a pair of taps 55 and 56 on the secondary winding 12 which are symmetrically spaced with respect to the mid-point of a secondary winding 12. There is also provided a switch rotor 58 which is adapted to short circuit the stator contacts 59 and 60 in each of the high band V. H. F. television station positions, the stator contacts 59 and 60 being connected to the taps 55 and 56 so that the portion 12*a* of the secondary winding included between the taps 55 and 56 is shorted out for high band reception. Preferably the rotor 58 is positioned on the backside of the switch section which includes the rotor 30 and is thus actuated in synchronism with the switch rotor 30 so that the cost of the station selector switch assembly is not substantially increased by the addition of the rotor 58 and the stator contacts 59 and 60. It will also be understood that in the low band station selecting positions the stator contacts 59 and 60 are open circuited by virtue of the gap in the rotor 58 so that the full secondary winding 12 is employed for low band reception.

Considering now the operation of the above described antenna input circuit of Fig. 1, during low band reception the portion 12*a* of the secondary winding 12 is not short circuited so that a relatively high impedance secondary circuit is provided, the AGC resistor 27 which preferably has a value of approximately 8200 ohms, together with the input impedance of the tube 20 providing the necessary loading for the secondary winding 12. Preferably the loading on the secondary winding 12 is chosen somewhat higher than that for optimum matching to a 300 ohm input impedance at the input terminals 15 and 16 so as to provide better noise performance on the low frequency channels. Thus, in the illustrated embodiment wherein the resistor 27 has a value of 8200 ohms an impedance of approximately 600 ohms is reflected back to the primary winding 11.

When the station selector switch is in a high frequency station selecting position the contacts 59 and 60 are shorted out by the rotor 58 so that the impedance of the secondary winding 12 is substantially decreased. Assuming that the tube 20 is of the commercial type 6BN4, the input impedance of this tube is approximately 400 ohms for frequencies in the high V. H. F. band and since the input circuit of the tube 20 is connected across only half of the secondary winding 12, by virtue of the above described balancing capacitors 50 and 51, a loading impedance of approximately 1200 ohms is effectively impressed across the secondary winding 12, this loading impedance of 1200 ohms being sufficient to reflect an impedance of approximately 300 ohms back to the primary winding 11 and hence provides substantially optimum matching of the antenna circuit to the input circuit of the tube 20 for the high V. H. F. television stations. However, in accordance with an important feature of the present invention, the above described impedance change of the secondary winding 12 is accomplished without destroying the capacitative balance of the secondary winding 12 with respect to ground. This will be readily apparent when it is realized that the taps 55 and 56 are symmetrical with respect to the mid-point of the secondary winding 12 which mid-point is at a virtual ground due to the balancing capacitors 50 and 51. Accordingly, the impedance change may be accomplished without unbalancing the input transformer 10 so that local oscillator signals which may appear on the output terminal 70 are coupled equally to both ends of the secondary winding 12 through hte condensers 22 and 25 with the result that no capacitative feedback to the antenna input terminals 15 and 16 is produced and no local oscillator signal radiation is experienced. In addition, the above described impedance switching arrangement has the advantage that symmetrical input response and good selectivity is achieved on all channels since the coupling between the primary and secondary windings of the transformer 10 is entirely magnetic and the secondary winding 12 and condensers 50 and 51 form a bridge circuit which provides the same attenuation for signals above and below the selected frequency band. Also, the voltage standing wave ratio has been found to be quite low on all channels with the arrangement of Fig. 1 wherein inductive coupling is employed between the primary and secondary of the transformer 10 and capacitative balance is maintained for all channels.

In Fig. 2 there is shown the constructional details of the input transformer 10. Referring to this figure, the primary winding 11 comprises a pair of cross wound sections 11*a* and 11*b*, one end of which are connected together to provide the center tap 13 the other ends 15*a* and 16*a* of these cross wound sections being connected to the input terminals 15 and 16, respectively. The primary winding 11 is wound on a tubular polystyrene coil form 80. The secondary winding 12 also comprises a pair of cross wound sections 12*b* and 12*c* which are tapped at points symmetrically spaced from the mid-point 12*d* of the winding 12 to provide the taps 55 and 56. While the secondary winding 12 has been illustrated in Fig. 2 as spaced from the primary winding 10 to simplify illustration of the manner in which these windings are wound, in the actual transformer the upper end of the secondary winding 12 is wound closely adjacent to the bottom end of the primary winding 10. With this arrangement a relatively loose coupling is provided which is sufficient to provide the correct impedance matching arrangement necessary for reception of signals in both the low and high frequency V. H. F. television bands.

While a single neutralized triode tube 20 has been illustrated in Fig. 1 as comprising the input amplifier stage of the tuner, it will be understood that any other type of input amplifier arrangement may be employed wherein neutralization is required. For example, the conventional cascode input amplifier circuit may be employed in which case a commercial type 6BS8 duo triode may be used and the anode of the first triode section 20 is connected directly to the cathode of the succeeding triode section which succeeding triode is operated as a grounded grid amplifier, the output of the cascode stage being derived from the anode circuit of the second amplifier stage, as will be readily understood by those skilled in the art.

While there has been described what is at present considered to be the preferred embodiment of the invention, it will be understood that various modifications may be made therein which are within the true spirit and scope of the invention as defined in the appended claims.

What is claimed as new and is desired to be secured by Letters Patent of the United States is:

1. In a television tuner, an antenna input circuit adapted to receive signals from a low frequency band of V. H. F.

television stations and a high frequency band of V. H. F. television stations, comprising an input transformer having a primary and a secondary winding, said primary winding having a center tap connected to ground and said secondary winding having a pair of taps symmetrically spaced from the mid-point of said secondary winding, an amplifier tube including a control grid and an anode, means connecting one end of said secondary winding to said control grid, means including a neutralizing condenser for connecting said anode to the other end of said secondary winding, station selector switch means, means including said switch means for tuning said secondary winding to stations in both said high and low frequency television bands, and means including said switch means for connecting said pair of taps together for predetermined ones of said television stations.

2. In a television tuner, an antenna input circuit adapted to receive signals from a low frequency band of V. H. F. television stations and a high frequency band of V. H. F. television stations, comprising an input transformer having a primary and a secondary winding, said primary winding having a center tap connected to ground and said secondary winding having a pair of taps symmetrically spaced from the mid-point of said secondary winding, an amplifier tube including a control grid and an anode, means connecting one end of said secondary winding to said control grid, means including a neutralizing condenser for connecting said anode to the other end of said secondary winding, station selector switch means, a plurality of inductances, means including said switch means for connecting said inductances across said secondary winding to tune the same to stations in both said high and low frequency bands, and means including said switch means for short circuiting the portion of said secondary winding included between said pair of taps for stations in said high frequency television band.

3. In a television tuner, an antenna input circuit adapted to receive signals from a low frequency band of V. H. F. television stations and a high frequency band of V. H. F. television stations, comprising an input transformer having a primary and a secondary winding, said primary winding having a center tap connected to ground and said secondary winding having a pair of taps symmetrically spaced from the mid-point of said secondary winding, an amplifier tube including a control grid and an anode, means connecting one end of said secondary winding to said control grid, means including a neutralizing condenser for connecting said anode to the other end of said secondary winding, station selector switch means, a plurality of inductances, means including said switch means for connecting said inductances across said secondary winding to tune the same to stations in both said high and low frequency bands, and means controlled by said switch means for connecting said pair of taps together when said switch means is in a position corresponding to one of the stations in said high frequency band.

4. In a television tuner, an antenna input circuit adapted to receive signals from a low frequency band of V. H. F. television stations and a high frequency band of V. H. F. television stations, comprising an input transformer having a primary and a secondary winding, said primary winding having a center tap connected to ground and said secondary winding having a pair of taps symmetrically spaced from the mid-point of said secondary winding, an amplifier tube including a control grid and an anode, means connecting one end of said secondary winding to said control grid, means including a neutralizing condenser for connecting said anode to the other end of said secondary winding, first and second groups of inductances, station selector switch means operable in a group of high band V. H. F. station selecting positions to connect different ones of said first group of inductances across said secondary winding and operable in a group of low band V. H. F. station selecting positions to connect different ones of said second group of inductances across said secondary winding, said selector switch means being operable in each of said high band V. H. F. station selecting positions to connect said pair of taps together.

5. In a television tuner, an antenna input circuit adapted to receive signals from a low frequency band of V. H. F. television stations and a high frequency band of V. H. F. television stations, comprising an input transformer having a balanced primary winding and a secondary winding, said secondary winding having a pair of taps symmetrically spaced from the mid-point of said secondary winding, an amplifier stage having an input circuit, station selector switch means, means including said switch means for tuning said secondary winding to stations in both said high and low frequency television bands, means for short circuiting the portion of said secondary winding included between said pair of taps when said station selector switch means is in a high band station selecting position, and means connecting at least a portion of the signal developed across said secondary winding to said input circuit.

6. In a television tuner, an antenna input circuit adapted to receive signals from a low frequency band of V. H. F. television stations and a high frequency band of V. H. F. television stations, comprising an input transformer having a balanced primary winding and a secondary winding, said secondary winding having a pair of taps symmetrically spaced from the mid-point of said secondary winding, station selector switch means, means including said switch means for tuning said secondary winding to stations in both said high and low frequency television bands, and means for short circuiting the portion of said secondary winding included between said pair of taps when said station selector switch means is in a high band station selecting position.

7. In a television tuner, an antenna input circuit adapted to receive signals from a low frequency band of V. H. F. television stations and a high frequency band of V. H. F. television stations, comprising an input transformer having a balanced primary winding comprising two cross wound sections having one end thereof connected together to form a center tap and a secondary winding comprising two cross wound sections having symmetrical taps spaced from one end thereof, station selector switch means, means including said switch means for tuning said secondary winding to stations in both said high and low frequency television bands, and means for short circuiting the portion of said secondary winding included between said pair of taps when said station selector switch means is in a high band station selecting position.

8. In a television tuner, an antenna input circuit adapted to receive signals from a low frequency band of V. H. F. television stations and a high frequency band of V. H. F. television stations, comprising an input transformer having a balanced primary winding and a secondary winding, said secondary winding having a pair of taps symmetrically spaced from the mid-point of said secondary winding, an amplifier including an input electrode and an output electrode, means connecting one end of said secondary winding to said input electrode, means connecting said output electrode to the other end of said secondary winding, station selector switch means, means including a pair of inductances for connecting said switch means across said secondary winding, means including said switch means for connecting successively larger inductive increments in series with said pair of inductances to tune said secondary winding to successive lower frequency stations in both said high and low frequency bands, and means for short circuiting the portion of said secondary winding included between said pair of taps when said station selector switch means is in a high band station selecting position.

(References on following page)

References Cited in the file of this patent

UNITED STATES PATENTS 1,683,081 Kolster ---------------- Sept. 4, 1928
2,085,403 Van Loon ------------ June 29, 1937
2,098,403 Rinia ------------------ Nov. 9, 1937
2,226,694 Buschbeck ------------ Dec. 31, 1940
2,511,673 Lawrence ------------ June 13, 1950
2,728,818 Mackey --------------- Dec. 27, 1955

FOREIGN PATENTS 712,955 Great Britain ------------ Aug. 4, 1954